US010569660B2

(12) United States Patent
Lee et al.

(10) Patent No.: US 10,569,660 B2
(45) Date of Patent: Feb. 25, 2020

(54) SYSTEMS AND METHODS FOR BATTERY STATE-OF-HEALTH MONITORING

(71) Applicant: Ford Global Technologies, LLC, Dearborn, MI (US)

(72) Inventors: Tae-Kyung Lee, Ann Arbor, MI (US); Imad Hassan Makki, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 474 days.

(21) Appl. No.: 15/054,686

(22) Filed: Feb. 26, 2016

(65) Prior Publication Data

US 2017/0246963 A1 Aug. 31, 2017

(51) Int. Cl.
| | |
|---|---|
| *H02J 7/00* | (2006.01) |
| *B60L 11/18* | (2006.01) |
| *H01M 10/44* | (2006.01) |
| *H01M 10/46* | (2006.01) |
| *H01M 10/48* | (2006.01) |

(52) U.S. Cl.
CPC ......... *B60L 11/1846* (2013.01); *H01M 10/44* (2013.01); *H01M 10/46* (2013.01); *H01M 10/486* (2013.01); *H01M 2220/20* (2013.01)

(58) Field of Classification Search
CPC .. G01R 31/392; G01R 31/389; G01R 31/382; G01R 31/3648; G01R 31/364; B60L 2240/545; B60L 2260/56; B60L 2260/167; B60L 58/27; B60L 58/34; Y02T 10/705; Y02T 10/7044; Y02T 10/7005; Y02T 10/7077; Y02T 90/124; Y02T 90/14; H01M 2220/20; H01M 10/486; H01M 2010/4271; H01M 10/052; H01M 10/4207; H01M 10/4221; H02J 7/0047; H02J 2007/005; H02J 7/0021; H02J 7/007; H02J 7/0004; H02J 7/0013; H02J 7/0024; H02J 7/0003; H02J 7/0057; H02J 7/0073; H02J 7/0083; H02J 7/0086; H02J 7/027; H02J 7/045; H02J 7/047; H02J 7/1446
USPC .................................................. 320/106–115
See application file for complete search history.

(56) References Cited

U.S. PATENT DOCUMENTS

| | | | |
|---|---|---|---|
| 9,132,745 B1 | 9/2015 | Lee | |
| 2003/0006735 A1* | 1/2003 | Kawakami | ........... G01R 31/361 320/133 |
| 2005/0017684 A1* | 1/2005 | Brecht | .................. H01M 10/44 320/131 |
| 2006/0043933 A1* | 3/2006 | Latinis | ............. G01R 19/16542 320/132 |
| 2006/0284600 A1* | 12/2006 | Verbrugge | ........... G01R 31/367 320/132 |
| 2007/0210742 A1* | 9/2007 | Brecht | .................. H02J 7/0091 320/104 |

(Continued)

*Primary Examiner* — Binh C Tat
(74) *Attorney, Agent, or Firm* — David Kelley; Brooks Kushman P.C.

(57) ABSTRACT

A vehicle includes a battery, and a controller programmed to charge and discharge the battery based on a health indicator output by a model that describes changes in internal resistance of the battery over time identified from (i) a plurality of different representative battery usage aggressiveness drive cycles and (ii) changes in internal resistance of the battery that are derived from a state of charge, temperature, and current associated with the battery.

10 Claims, 4 Drawing Sheets

(56) References Cited

U.S. PATENT DOCUMENTS

| | | | |
|---|---|---|---|
| 2009/0027056 A1* | 1/2009 | Huang | B60L 58/12 |
| | | | 324/439 |
| 2012/0105069 A1* | 5/2012 | Wang | G01R 31/392 |
| | | | 324/427 |
| 2013/0278223 A1 | 10/2013 | Li et al. | |
| 2015/0097512 A1* | 4/2015 | Li | B60L 11/182 |
| | | | 320/101 |
| 2015/0147608 A1 | 5/2015 | Lin et al. | |
| 2015/0171640 A1 | 6/2015 | Lee | |
| 2016/0020618 A1* | 1/2016 | Yang | H02J 7/022 |
| | | | 320/162 |
| 2016/0114696 A1* | 4/2016 | Eifert | B60L 11/1861 |
| | | | 320/134 |

* cited by examiner

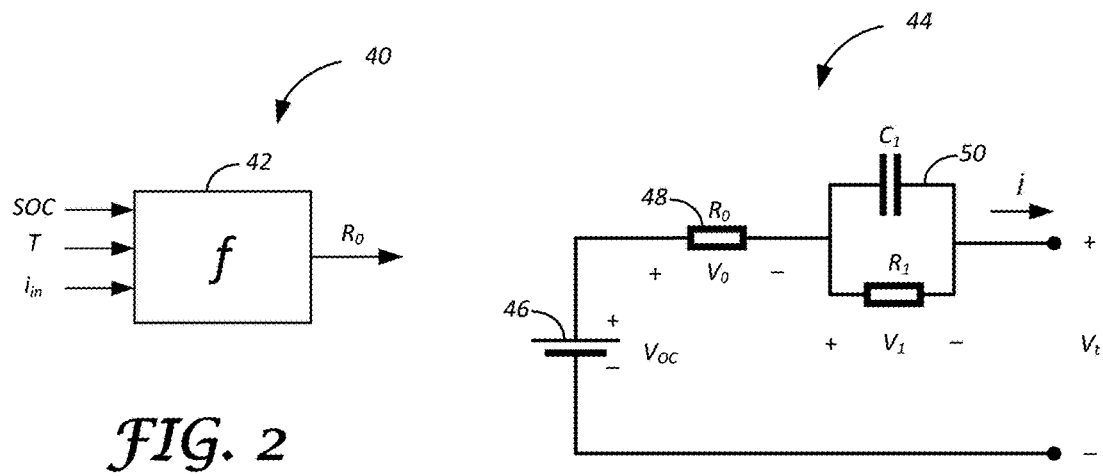
FIG. 2
FIG. 3
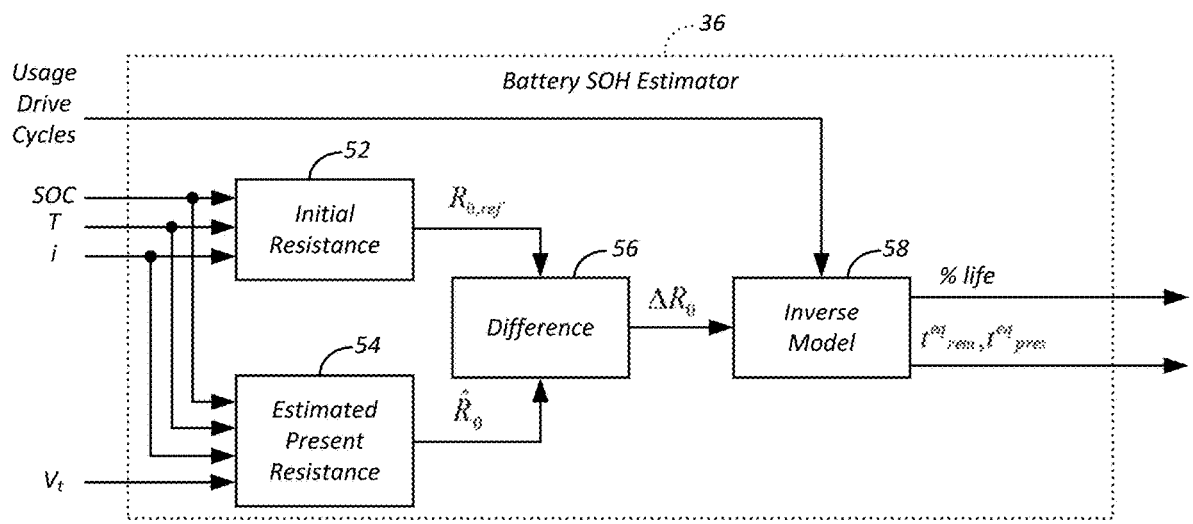
FIG. 4

SYSTEMS AND METHODS FOR BATTERY STATE-OF-HEALTH MONITORING

TECHNICAL FIELD

The present disclosure relates to systems and methods for estimating at least one parameter indicative of a state-of-health (SOH) of a high-voltage (HV) battery from changes in internal resistance identified from a plurality of different battery usage drive cycles.

BACKGROUND

The term "electric vehicle" can be used to describe vehicles having at least one electric motor for vehicle propulsion, such as battery electric vehicles (BEV), hybrid electric vehicles (HEV), and plug-in hybrid electric vehicles (PHEV). A BEV includes at least one electric motor, wherein the energy source for the motor is a battery that is re-chargeable from an external electric grid. An HEV includes an internal combustion engine and one or more electric motors, wherein the energy source for the engine is fuel and the energy source for the motor is a battery. In an HEV, the engine is the main source of energy for vehicle propulsion with the battery providing supplemental energy for vehicle propulsion (the battery buffers fuel energy and recovers kinetic energy in electric form). A PHEV is like an HEV, but the PHEV has a larger capacity battery that is rechargeable from the external electric grid. In a PHEV, the battery is the main source of energy for vehicle propulsion until the battery depletes to a low energy level, at which time the PHEV operates like an HEV for vehicle propulsion.

SUMMARY

A vehicle includes a battery, and a controller programmed to charge and discharge the battery based on a health indicator output by a model that describes changes in internal resistance of the battery over time identified from (i) a plurality of different representative battery usage aggressiveness drive cycles and (ii) changes in internal resistance of the battery that are derived from a state of charge, temperature, and current associated with the battery.

A vehicle power system controller includes input channels configured to receive signals representing a plurality of different representative battery usage aggressiveness drive cycles and changes in internal resistance of a battery that are derived from a state of charge, temperature, and current associated with the battery, output channels configured to output a health indicator, and control logic configured to generate the health indicator via a model that takes as input the signals.

A method includes charging and discharging a battery by a controller according to a health indicator output by a model that describes changes in internal resistance of the battery over time identified from (i) a plurality of different representative battery usage aggressiveness drive cycles and (ii) changes in internal resistance of the battery that are derived from a state of charge, temperature, and current associated with the battery.

BRIEF DESCRIPTION OF THE DRAWINGS

FIG. 2 is a block diagram illustrating a function mapping a plurality of battery operating parameters to internal resistance;

FIG. 3 is an electric circuit diagram illustrating an equivalent circuit model of a high voltage (HV) battery circuit;

FIG. 4 is a block diagram illustrating a battery state-of-health (SOH) estimator for estimating a present battery life and a remaining battery life identified from a plurality of HV battery usage drive cycles;

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
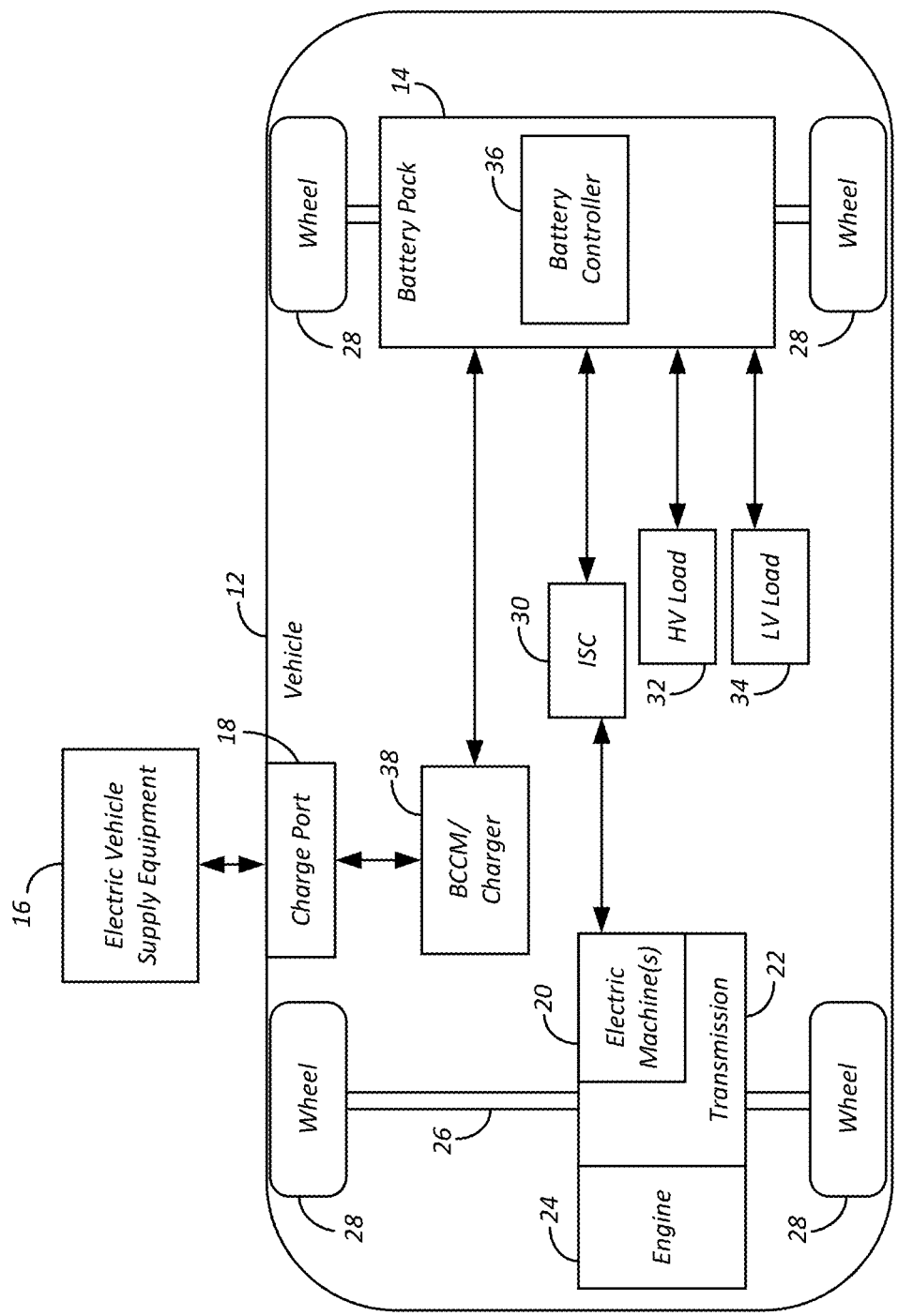
FIG. 1 is a block diagram of a plug-in hybrid electric vehicle (PHEV) illustrating a typical drivetrain and energy storage components.

FIG. 1 depicts a typical plug-in hybrid-electric vehicle (PHEV). A plug-in hybrid-electric vehicle 12, hereinafter vehicle 12, may comprise at least one traction battery or battery pack 14 configured to receive electric charge via a charging session at a charging station (not shown) connected to a power grid (not shown). The vehicle 12 may, for example, cooperate with electric vehicle supply equipment (EVSE) 16 of the charging station to coordinate the transfer of electric energy from the power grid to the battery pack 14. The power grid may include a device that harnesses renewable energy, such as a photovoltaic (PV) solar panel, or a wind turbine (not shown).

The EVSE 16 may include circuitry and controls to regulate and manage the transfer of electric energy between the power grid and the vehicle 12. For example, the EVSE 16 may have a charge connector for plugging into a charge port 18 of the vehicle 12, such as via connector pins that mate with corresponding recesses of the charge port 18. The charge port 18 may be any type of port configured to transfer power from the EVSE 16 to the vehicle 12. In one example, the EVSE 16 includes a control module (not shown) that conditions the power supplied from the EVSE 16 to provide the proper voltage and current levels to the vehicle 12.

A battery charger control module (BCCM) 38 in communication with the charge port 18 may control the charge flow between the battery pack 14 and the EVSE 16. In one example, the BCCM 38 may be in communication with one or more battery controllers (hereinafter, battery state-of-health (SOH) estimator) 36 of the battery pack 14. The battery SOH estimator 36 may be configured to control the battery pack 14. In one example, the battery SOH estimator 36 may be configured to control the battery pack 14 based on parameters indicative of battery power capability.

The vehicle 12 may further comprise one or more electric machines 20 in cooperation with a hybrid transmission 22. The electric machines 20 may be capable of operating as a motor or a generator. In addition, the hybrid transmission 22 is mechanically connected to an engine 24. The hybrid transmission 22 is also mechanically connected to a drive shaft 26 that is mechanically connected to the wheels 28.

The electric machines 20 can provide propulsion capability when the engine 24 is turned on or off using energy stored in the battery pack 14. The electric machines 20 also act as generators and can provide fuel economy benefits by recovering energy that would normally be lost as heat in the friction braking system. The electric machines 20 may also provide reduced pollutant emissions since the vehicle 12 may be operated in electric mode under certain conditions.

The battery pack 14 typically provides a high voltage DC output. The battery pack 14 may be electrically connected to an inverter system control (ISC) 30. The ISC 30 is electrically connected to the electric machines 20 and provides the ability to bi-directionally transfer energy between the battery pack 14 and the electric machines 20. In a motor mode, the ISC 30 may convert the DC output provided by the battery pack 14 to a three-phase alternating current as may be required for proper functionality of the electric machines 20. In a regenerative mode, the ISC 30 may convert the three-phase AC output from the electric machines 20 acting as generators to the DC voltage required by the battery pack 14. While FIG. 1 depicts a typical plug-in hybrid electric vehicle, the description herein is equally applicable to a pure electric vehicle. For a pure electric vehicle, e.g., battery electric vehicle (BEV), the hybrid transmission 22 may be a gear box connected to the electric machine 20 and the engine 24 may not be present.

In addition to providing energy for propulsion, the battery pack 14 may provide energy for other vehicle electrical systems. For example, the battery pack 14 may transfer energy to high-voltage loads 32, such as compressors and electric heaters. In another example, the battery pack 14 may provide energy to low-voltage loads 34, such as an auxiliary 12V battery. In such an example the vehicle 12 may include a DC/DC converter module (not shown) that converts the high voltage DC output of the battery pack 14 to a low voltage DC supply that is compatible with the low-voltage loads 34. The various components discussed may have one or more associated controllers to control and monitor the operation of the components. The controllers may communicate via a serial bus (e.g., Controller Area Network (CAN)) or via discrete conductors.

As mentioned previously, the battery SOH estimator 36 may be configured to control the battery pack 14 based on parameters indicative of battery power capability such as, for example, an internal resistance. The power capability monitoring may enable the battery SOH estimator 36 to estimate parameters characterizing the life of the battery pack 14 and other performance and operation factors of the vehicle 12. As will be explained in further detail in reference to FIG. 3, the battery SOH estimator 36 may estimate the battery power capability by processing voltage and current levels as illustrated, for example, in an equivalent circuit model 44.

In one example, the battery SOH estimator 36 may estimate the battery power capability based on one or more battery model parameters characterizing battery state-of-health (SOH). Battery SOH is a metric indicative of a battery aging level due to one or more degradation mechanisms of the battery pack 14, such as, but not limited to, a calendar fade, a cycling fade, and so on. The calendar fade may in some cases result from, for example, but not limited to, a solid-electrolyte interphase (SEI) layer, or an increase in the active solid particles in the negative electrode of the battery pack 14, loss of cyclable lithium ions, and so on. The cycling fade may in some cases be brought on, for example, but not limited to, by active material structure degradation, a mechanical fracture, and so on. The battery operating parameters indicative of battery SOH include, but are not limited to, battery capacity, internal resistance (in some cases may be expressed as battery impedance) and so on.

A change in internal resistance $R_0$ of the battery pack 14 may affect the battery power capability, thus resulting in the change of battery SOH. For example, a rise in the internal resistance $R_0$ may result in a lower battery power capability indicative of a lower battery SOH. As will be explained in further detail in reference to FIG. 3, the battery SOH estimator 36 may estimate one or more battery model parameters indicative of the battery SOH, e.g., internal resistance, and so on, using a battery life model.

The battery SOH estimator 36 may be configured to determine a change in the internal resistance $R_0$ of the battery pack 14 at a present time over the life of the battery pack 14 using an initial internal resistance $R_{0,ref}$, i.e., a beginning-of-life (BOL) internal resistance, and an estimated present internal resistance $\hat{R}_0$, i.e., an estimated internal resistance of the battery pack 14 at a predetermined (present) time. The battery SOH estimator 36 may be further configured to determine a percentage of battery life remaining % life estimated based on a change in the internal resistance $\Delta R_0$ of the battery pack 14 over a predetermined period. The battery SOH estimator 36 may be configured to determine a usage time to-date $t^{eq}_{pres}$ and a usage time remaining in the battery life $t^{eq}_{rem}$, e.g., a usage time remaining until end-of-life (EOL) of the battery pack 14, based on a change in the internal resistance $\Delta R_0$ of the battery pack 14 over a predetermined period of time. In one example, the battery SOH estimator 36 may determine a percentage of battery life remaining % life, a usage time to date $t^{eq}_{pres}$, and a usage time remaining in the battery life $t^{eq}_{rem}$, using an inverse of a battery life model based on a plurality of different representative battery usage aggressiveness drive cycles.

In one example, the battery SOH estimator 36 may be configured to use a predetermined value as the initial internal resistance $R_{0,ref}$ of the battery pack 14, such as, for example, a predetermined value designated by the manufacturer of the battery pack 14. In another example, the battery SOH estimator 36 may be configured to determine the initial internal resistance $R_{0,ref}$ using one or more measured (or received) battery operating parameters, such as, but not limited to, battery current, voltage, temperature, and so on. In another example, the battery SOH estimator 36 may be configured to calculate the initial internal resistance $R_{0,ref}$ using, among other parameters, resistance of one or more battery cell terminals, electrodes and/or inter-connections, resistance of electrolyte, resistance of cathode and anode separator, capacitance of one or more plates forming electrodes of the cell, and contact resistance between one or more electrodes and electrolyte.

The battery SOH estimator 36 may be configured to determine the estimated present internal resistance $\hat{R}_0$ using measured (or received) values of battery current, voltage, temperature, and so on. In one example, the battery SOH estimator 36 may determine the estimated present internal resistance $\hat{R}_0$ using one or more battery usage drive cycles and other vehicle, high-voltage system, and/or battery operating parameters.

Shown in FIG. 2 is an example function mapping 40 illustrating estimating the internal resistance $R_0$ of the battery pack 14 at the beginning-of-life using one or more operating parameters, including, but not limited to, SOC, current, and temperature. In one example, the internal resistance $R_0$ of the battery pack 14 may be represented using a function $f$ 42:

$$R_0(k)=f(SOC(k),T(k),i_{in}(k-1),\ldots)\approx f(SOC(k),T(k),i_{in}(k)), \quad (1)$$

where SOC is a state-of-charge of the battery pack 14, T is a temperature of the battery pack 14, $i_{in}$ is an input current of the battery pack 14, and k is a predetermined time, e.g., present time.

Referring now to FIG. 3, an equivalent circuit model 44 representative of the high-voltage system of the vehicle 12. The model 44 produces a battery terminal voltage $V_t$ in response to receiving an input current i. In one example, one or more dynamic responses of the model 44, as shown, may be representative of one or more dynamic responses of the battery pack 14. An open circuit voltage $V_{OC}$ may be voltage across an exemplary battery 46 at a time when no loads are drawing current, such as, for example, during idle period between discharges, i.e., relaxation period. The internal resistance of the equivalent circuit model 44 may be represented by a resistor $R_0$ 48 creating a voltage drop $V_0$. Dynamic response of a parallel RC (resistor-capacitor) configuration 50 creating a voltage drop $V_1$ may be representative of the dynamic response of the battery pack 14. The terminal voltage $V_t$ may be representative of a voltage across positive and negative terminals of the battery pack 14. Consistent with Kirchhoff's Voltage Law (KVL) the battery terminal voltage $V_t$ may be represented as:

$$V_t=V_{OC}-V_1-R_0 i. \quad (2)$$

In one example, the battery SOH estimator 36 may use a battery life model to determine the estimated present internal resistance $\hat{R}_0$. In such an example, the battery SOH estimator 36 may determine the estimated present internal resistance $\hat{R}_0$ of the battery pack 14 from the measured battery inputs and outputs. In another example, the battery SOH estimator 36 may determine the estimated internal resistance $\hat{R}_0$ using a variety of estimator designs, such as, but not limited to, designs using one or more extended Kalman filters (EKF), unscented Kalman filters, particle filters, and so on.

In reference to FIG. 4, the battery SOH estimator 36 configured to determine variables (or parameters) indicative of SOH of the battery pack 14, such as, but not limited to, a percentage of life remaining, a usage time remaining until EOL, and a usage time to-date, is shown. The battery SOH estimator 36 may be configured to receive one or more parameters associated with the operation of the battery pack 14. In one example, the battery SOH estimator 36 may receive one or more parameters indicative of a battery SOC, temperature T, current i, and battery terminal voltage $V_t$.

As shown at block 52, the battery SOH estimator 36 may determine the initial internal resistance $R_{0,ref}$, i.e., beginning of life (BOL) resistance of the battery pack 14, in response to receiving (or measuring) the one or more parameters associated with the operation of the battery pack 14, including, but not limited to, the battery SOC, temperature, current, voltage and so on. The battery SOH estimator 36 may determine the initial internal resistance $R_{0,ref}$ using, for example, but not limited to, one or more internal resistance and/or impedance maps provided by a manufacturer of the battery pack 14.

The battery SOH estimator 36, as shown at block 54, may be configured to determine the estimated present internal resistance $\hat{R}_0$ in response to receiving (or measuring) the one or more variables associated with the operation of the battery pack 14, such as, but not limited to, the battery SOC, temperature, current, battery terminal voltage, and so on. In one example, the battery SOH estimator 36 may use a battery life model to determine the estimated present internal resistance $\hat{R}_0$. In one example, a battery life model of the battery pack 14 may be represented as:

$$R=a_1 t^2+a_2 N, \quad (3)$$

where $a_1 t^2$ is a term reflective of a calendar fade of the battery pack 14, $a_2 N$ is a term reflective of a cycling fade of the battery pack 14 over N cycles, and $a_1$, $a_2$ are coefficients determined as a function of one or more parameters associated with the operation of the battery pack 14, such as, but not limited to, depth-of-discharge (DOD), temperature T, open-circuit voltage $V_{OC}$, and so on. The calendar fade and the cycling fade may in some cases result from one or more conditions contributing to battery degradation, such as, but not limited to, SEI growth, loss of cyclable lithium, active material structure degradation, a mechanical fracture, and so on. In one example, the battery life model may be identified from the battery test data under one or more different representative battery usage aggressiveness drive cycles, e.g., mild, moderate, and aggressive operation of the vehicle 12 and/or battery pack 14.

Figure 5:
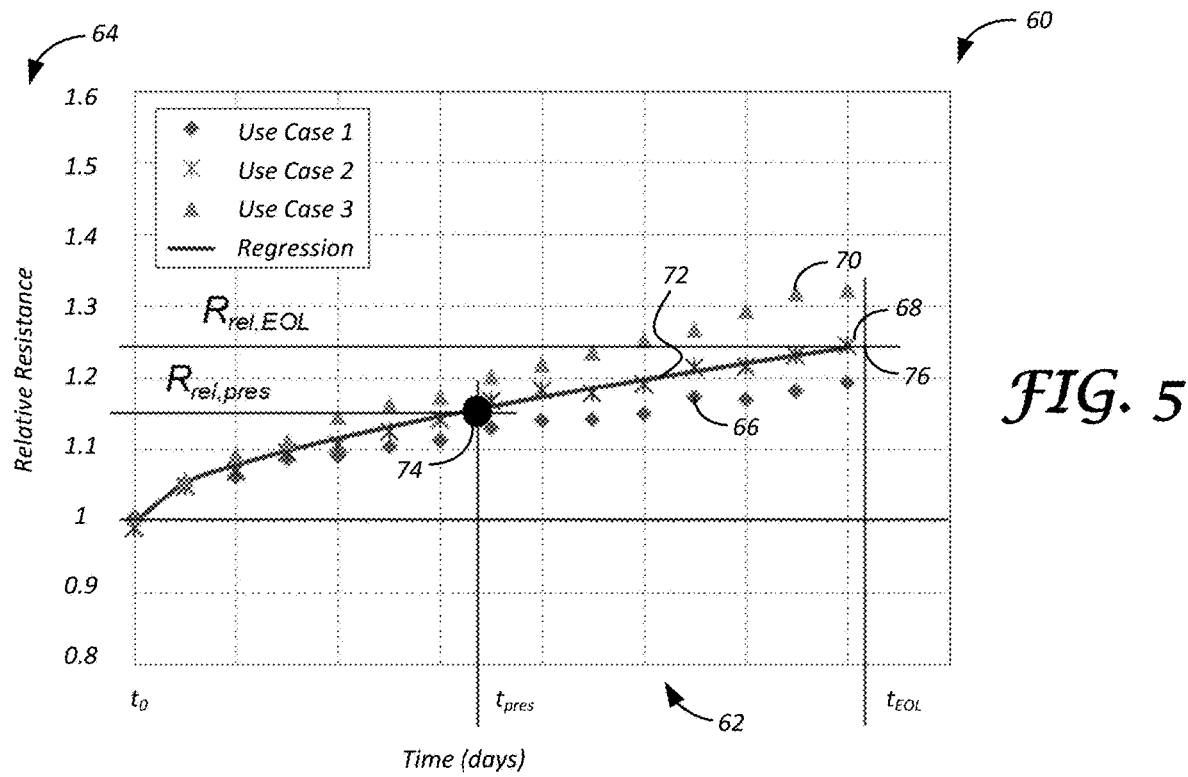
FIG. 5 is a graph illustrating changes in relative resistance of an HV battery over a period of time identified from a plurality of HV battery usage drive cycles.

Referring to FIG. 5, an example relative internal resistance profile 60 of the battery pack 14 is shown. The example relative internal resistance graph 60 has an x-axis representing time 62 measured in days and a y-axis representing relative resistance 64. The relative resistance 64 may be an internal resistance of the battery pack 14 at a time t, e.g., at a present time $t_{pres}$, divided by an internal resistance at beginning-of-life (BOL) $R_{BOL}$. As will be described in further detail in reference to FIG. 4, the battery SOH estimator 36 may determine the relative internal resistance at a present time from the difference between the estimated internal resistance at present and the internal resistance at the BOL.

The relative internal resistance may be affected by at least one of a plurality of battery operating scenarios (use cases), specifically by battery usage aggressiveness drive cycles or the varying aggressiveness of the battery operation. The example relative internal resistance profile 60 illustrates data measured or calculated under different operating scenarios, such as a first operating scenario 66, a second operating scenario 68, and a third operating scenario 70. The battery SOH estimator 36 may identify a regression curve for one or more different representative battery usage aggressiveness drive cycles (operating scenarios). A regression curve 72 of the example profile 60 may represent a regression of a data set associated with the second operating scenario (use case) 68.

The battery SOH estimator 36 may select one of the operating scenarios based on measured battery current and changes in magnitude, duration, and frequency of current and SOC. In one example, the first, second, and third operating scenarios 66, 68, 70 may represent mild, moderate, and aggressive battery operating scenarios, respectively. The moderate operating scenario may be characterized by a change in magnitude of current and SOC that is greater than the change in magnitude of current and SOC of the mild operating scenario, and the aggressive operating scenario is characterized by a change in magnitude of current and SOC that is greater than the change in magnitude of current and SOC of the moderate operating scenario.

In one example, the battery SOH estimator 36 may determine the regression curve 72 by applying a generalized linear regression analysis to a data set associated with one or more of a plurality of operating scenarios, e.g., one or more of the first, second, and third operating scenarios 66, 68, 70. In one example, a generalized linear regression analysis is a method to identify the model parameters from the measured data of one or more independent variables (predictors) and one or more dependent variables (response) in the generalized linear model, thus minimizing the error between the measurement data and the determined model outputs. In one example, a regression analysis determines best fit parameters using, for example, but not limited to, a weighted least-squares method, an ordinary least-squares method, and so on.

Using the inverse of the regression curve 72, the battery SOH estimator 36 may estimate a usage time to-date $t_{pres}$ from a present relative resistance $R_{rel,pres}$ 74 under at least one of a plurality battery operating scenarios. The present relative resistance $R_{rel,pres}$ 74 may be calculated from the estimated present internal resistance $\hat{R}_0$. Using the regression curve 72, the battery SOH estimator 36 may also determine, for example, a projected usage time to an end-of-life (EOL) $t_{EOL}$ 76 for a predetermined EOL relative resistance $\hat{R}_{rel,EOL}$. In one example, a predetermined EOL relative resistance $\hat{R}_{rel,EOL}$ may be specified by a manufacturer of the battery pack 14.

Referring to FIG. 4, the battery SOH estimator 36 may determine a change in internal resistance $R_0$, using, for example, but not limited to, a difference between the initial internal resistance $R_{0,ref}$, i.e., internal resistance of the battery pack 14 at the BOL, and the estimated present internal resistance $\hat{R}_0$. In one example, the $\Delta R_0$ determined using a battery life model may be expressed as:

$$\Delta R_0 = g(t^{eq}|\text{use case}), \quad (4)$$

where $t^{eq}$ is an equivalent battery usage time under one or more of a plurality of different representative battery usage aggressiveness drive cycles (use cases). As previously described in reference to FIG. 5, the battery SOH estimator 36 may identify one or more different representative battery usage aggressiveness drive cycles (use cases) from the available battery operation data. In one example, one or more of the plurality of different representative battery operating scenarios or usage aggressiveness drive cycles may be defined by a change in magnitude of current and/or SOC that is greater than the change in magnitude of another one of the plurality of different representative battery usage aggressiveness drive cycles. In another example, the battery SOH estimator 36 may apply a generalized regression analysis to the one or more of the plurality of different representative battery operating scenarios or usage aggressiveness drive cycles to determine one or more health indicators of the battery pack 14.

The battery SOH estimator 36 may be configured to determine the percentage of battery life remaining % life and the usage time remaining $t^{eq}_{rem}$ until the end-of-life (EOL) from the estimated change in the internal resistance $\Delta R_0$ of the battery pack 14 within a predetermined period under one or more different representative battery usage aggressiveness drive cycles (use cases). As shown at block 58, the battery SOH estimator 36 may determine the percentage of battery life remaining % life and the usage time remaining $t^{eq}_{rem}$ from the estimated usage time to-date $t^{eq}_{pres}$ using an inverse of a battery life model and the estimated present internal resistance change $\Delta R_0$. An equivalent battery usage time $t^{eq}_{pres}$ at a present time under one or more of a plurality of different representative battery usage aggressiveness drive cycles (use cases) may be represented as:

$$t^{eq}_{pres} = g^{-1}(\Delta R_0|\text{use case}). \quad (5)$$

As previously described in reference to FIG. 5, the one or more of the plurality of different representative battery usage aggressiveness drive cycles may be defined by a change in magnitude of current and/or SOC that is greater than the change in magnitude of another one of the plurality of different representative battery usage aggressiveness drive cycles. The percentage of battery life remaining % life and the usage time remaining in the battery life $t^{eq}_{rem}$ may be expressed as Equations (6) and (7), respectively:

$$\% \text{ life} = \left(1 - \frac{t^{eq}_{pres}}{t^{eq}_{EOL}}\right) \times 100 = \left(1 - \frac{g^{-1}(\Delta R_0|\text{use case})}{t^{eq}_{EOL}}\right) \times 100, \quad (6)$$

$$t^{eq}_{remain} = t^{eq}_{EOL} - t^{eq}_{pres} = t^{eq}_{EOL} - g^{-1}(\Delta R_0|\text{use case}). \quad (7)$$

Figure 6:
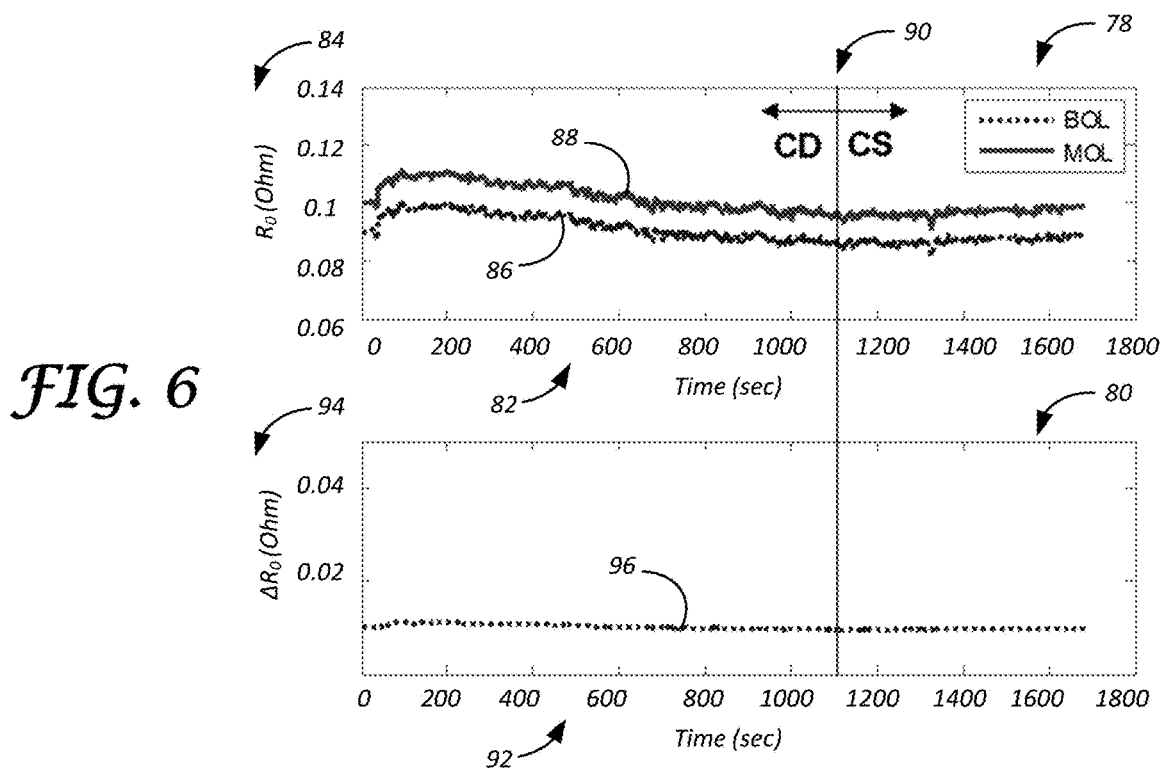
FIG. 6 is a pair of graphs illustrating estimated internal resistances for an HV battery at the beginning-of-life (BOL) and at the middle-of-life (MOL)

Shown in FIG. 6 are estimated internal resistance profiles at the BOL and the middle-of-life (MOL) 78 and a change in the internal resistance profile at the MOL 80, estimated for the battery pack 14 of the vehicle 12 using, for example, battery test data. The estimated internal resistance profiles 78 are depicted in the graph constituting an x-axis representing time 82 measured in seconds and a y-axis representing estimated resistance 84 of the battery pack 14 measured in ohms.

The estimated internal resistance profiles 78 include an estimated internal resistance profile at middle-of-life (MOL) $\hat{R}_{MOL}$ 86 that is greater than an estimated internal resistance profile at beginning-of-life (BOL) $\hat{R}_{BOL}$ 88 of the battery pack 14 during vehicle 12 and/or battery pack 14 operation. The estimated internal resistance at BOL $\hat{R}_{BOL}$ 86 and the estimated internal resistance at MOL $\hat{R}_{MOL}$ 88 of the battery pack 14 may fluctuate based on the battery status and the driving modes of the vehicle 12 including a transition period 90 between a charge depleting (CD) and a charge sustaining (CS) driving modes of the system. The estimated internal resistance at MOL $\hat{R}_{MOL}$ 88 may be greater than the estimated internal resistance at BOL $\hat{R}_{BOL}$ 86 due to one or more degradation mechanisms, such as, but not limited to, SEI growth, loss of cyclable lithium, active material structure degradation, a mechanical fracture, and so on.

The change in internal resistance profile 80 is depicted in an x-axis representing time 92 measured in seconds and a y-axis representing a change in internal resistance $\Delta R_0$ 94 measured in ohms. A change in internal resistance curve 96 may be representative of a difference between the estimated (or calculated using a predetermined calibration value) internal resistance at BOL $\hat{R}_{BOL}$ 86 and the estimated internal resistance at MOL $\hat{R}_{MOL}$ 88 of the battery pack 14 during operation of the vehicle 12 and/or battery pack 14. The change in internal resistance curve 96 may illustrate that the change in internal resistance $\Delta R_0$ of the battery pack 14 remains relatively constant regardless of vehicle operating modes, such as, a charge depleting (CD) and a charge sustaining (CS) driving modes.

The change in internal resistance $\Delta R_0$ is used to compute the relative internal resistance, and the computed relative internal resistance is used to estimate percentage of battery life remaining % life and the usage time remaining until EOL $t^{eq}_{rem}$. The battery SOH estimator 36 may charge and discharge the battery pack 14 according to a health indicator output by a battery life model describing the change in internal resistance $\Delta R_0$ over a predetermined period.

Figure 7:
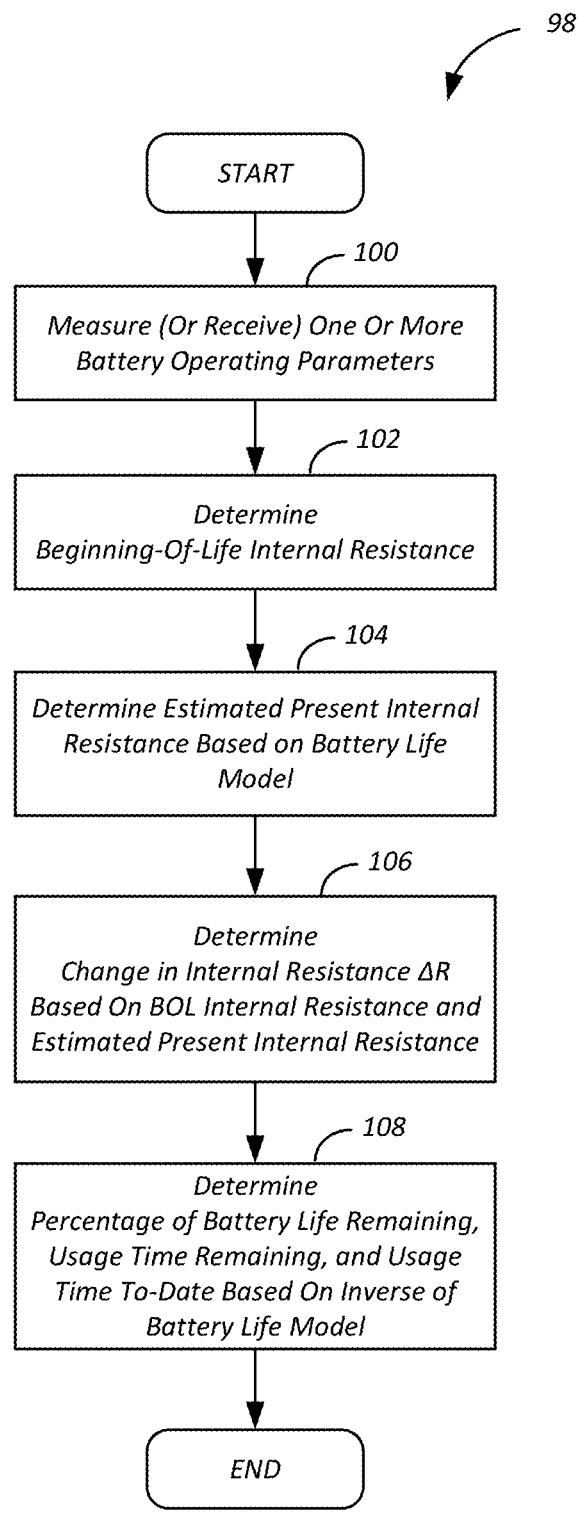
FIG. 7 is a flowchart illustrating an algorithm for monitoring an HV battery SOH.

Shown in FIG. 7 is a process 98 for monitoring one or more battery SOH indicators. The process 98 may begin at block 100 where the battery SOH estimator 36 measures (or receives) one or more parameters associated with the operation of the battery pack 14. In one example, the battery SOH estimator 36 may measure one or more battery inputs and responses including a battery SOC, temperature T, current i, and other inputs or responses. In response to measuring (or receiving) the battery inputs and responses associated with the operation of the battery pack 14, at block 102 the battery SOH estimator 36 determines the initial internal resistance $R_{0,ref}$, i.e., internal resistance at BOL, based, for example, on impedance maps provided by a manufacturer of the battery pack 14.

At block 104, in response to measuring the battery inputs and responses associated with the operation of the battery pack 14, the battery SOH estimator 36 determines the estimated present internal resistance $\hat{R}_0$ using, for example, an estimator designed based on a battery model used to represent the battery dynamics in the vehicle 12. In one example, the battery life model may describe changes in internal resistance over time identified from a plurality of different representative battery usage aggressiveness drive cycles, i.e., operating scenarios or use cases, where one of the plurality of different representative battery usage aggressiveness drive cycles may be defined by a change in magnitude of current and/or SOC that is greater than the change in magnitude of another one of the plurality of different representative battery usage aggressiveness drive cycles.

The battery SOH estimator 36, at block 106, determines a change in internal resistance $R_0$ at a present time using, for example, but not limited to, a difference between the initial internal resistance $R_{0,ref}$ and the estimated present internal resistance $\hat{R}_0$. At block 108 the battery SOH estimator 36 determines the percentage of battery life remaining % life and the usage time remaining until EOL $t^{eq}_{rem}$ using the estimated usage time to-date $t^{eq}_{pres}$ determined using an inverse of a battery life model and the estimated present internal resistance change $\Delta R_0$ of the battery pack 14. At this point the process 98 may end. In one example, the process 98 may be repeated in response to receiving one or more parameters associated with operation of the battery pack 14 or in response to another signal or request.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    a battery;
    a memory; and
    a controller operable to,
    determine a reference internal resistance of the battery by correlating a battery state of charge (SOC), a battery temperature, and a battery current to an impedance map stored in the memory;
    determine a present internal resistance of the battery based on the sum of a battery calendar fade and a battery cycle fade, wherein the battery calendar fade and the battery cycle fade are determined using the battery SOC, the battery temperature, the battery current, and a battery terminal voltage;
    determine a battery resistance change based on the difference between the reference internal resistance and the present internal resistance; and
    charge and discharge the battery based on a battery health indicator, wherein the battery health indicator is determined by applying an inverse battery life model using the battery, resistance change and one or more battery usage aggressiveness drive cycles.

2. The vehicle of claim 1, wherein the health indicator is indicative of a percentage of life remaining of the battery, a usage tune remaining until end-of-life of the battery, or a usage time to-date of the battery.

3. The vehicle of claim 2, wherein the inverse battery life model defines the end-of-life.

4. The vehicle of claim 2, wherein the percentage of life remaining and the usage time remaining are defined using the usage time to-date, and wherein the usage time to-date is defined from correlating the proportion to the curve.

5. The vehicle of claim 1, wherein the curve includes a best-fit curve defined using a regression analysis.

6. A method comprising:
    determining a reference internal resistance of a battery by correlating a battery state of charge (SOC), a battery temperature, and a battery current to an impedance map;

determining a present internal resistance of the battery based on the sum of a battery calendar fade and a battery cycle fade, wherein the battery calendar fade and the battery cycle fade are determined using the battery SOC, the battery temperature, the battery current, and a battery terminal voltage;

determining a battery resistance change based on the difference between the reference internal resistance and the present internal resistance; and charging and discharging the battery based on a battery health indicator, wherein the battery health indicator is determined by applying an inverse battery life model using the battery resistance change and one or more battery usage aggressiveness drive cycles.

7. The method of claim 6, wherein the health indicator is indicative of a percentage of life remaining of the battery, a usage time remaining until end-of-life of the battery, or a usage time to-date of the battery.

8. The method of claim 7, wherein the inverse battery life model defines the end-of-life of the battery.

9. The method of claim 7, wherein the percentage of life remaining and the usage time remaining are defined using the usage time to-date, and wherein the usage time to-date is defined from correlating the proportion to the inverse battery life model.

10. The method of claim 6, wherein the inverse battery life model includes a best-fit curve defined using a regression analysis.

* * * * *